United States Patent
Kurihara et al.

(10) Patent No.: US 6,970,999 B2
(45) Date of Patent: Nov. 29, 2005

(54) COUNTING LATENCIES OF AN INSTRUCTION TABLE FLUSH, REFILL AND INSTRUCTION EXECUTION USING A PLURALITY OF ASSIGNED COUNTERS

(75) Inventors: Toshihiko Kurihara, Kanagawa-ken (JP); Hung Qui Le, Austin, TX (US); Alexander Erik Mericas, Austin, TX (US); Robert Dominick Mirabella, Round Rock, TX (US); Hideki Mitsubayashi, Austin, TX (US); Michitaka Okuno, Nagano (JP); Masahiro Tokoro, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 557 days.

(21) Appl. No.: 10/210,415

(22) Filed: Jul. 31, 2002

(65) Prior Publication Data
US 2004/0025146 A1 Feb. 5, 2004

(51) Int. Cl.$^7$ .............................................. G06F 15/00
(52) U.S. Cl. ...................................... 712/227; 717/127
(58) Field of Search ........................ 712/227; 717/127; 714/39

(56) References Cited

U.S. PATENT DOCUMENTS

| | | | | |
|---|---|---|---|---|
| 5,666,507 A | * | 9/1997 | Flora | 712/218 |
| 5,696,955 A | * | 12/1997 | Goddard et al. | 712/222 |
| 5,751,945 A | * | 5/1998 | Levine et al. | 714/47 |
| 5,987,598 A | * | 11/1999 | Levine et al. | 712/227 |
| 6,195,748 B1 | * | 2/2001 | Chrysos et al. | 712/227 |
| 6,233,531 B1 | * | 5/2001 | Klassen et al. | 702/80 |

* cited by examiner

*Primary Examiner*—Eddie Chan
*Assistant Examiner*—Kevin Rizzuto
(74) *Attorney, Agent, or Firm*—Mark E. McBurney; Dilllon & Yudell LLP

(57) ABSTRACT

A method and system for analyzing cycles per instruction (CPI) performance in a processor. A completion table corresponds to the instructions in a group to be processed by the processor. An empty completion table indicates that there has been some type of catastrophe that caused a table flush. While the table is empty, a performance monitoring counter (PMC), located in a performance monitoring unit (PMU) in the processor, counts the number of clock cycles that the table is empty. Preferably, a separate PMC is utilized depending on the reason that the completion table is empty. A second PMC likewise counts the number of clock cycles spent re-filling the empty completion table. A third PMC counts the number of clock cycles spent actually executing the instructions in the completion table. The information in the PMC's can be used to evaluate the true cause for degradation of CPI performance.

8 Claims, 5 Drawing Sheets

COUNTING LATENCIES OF AN INSTRUCTION TABLE FLUSH, REFILL AND INSTRUCTION EXECUTION USING A PLURALITY OF ASSIGNED COUNTERS

RELATED APPLICATIONS

The present invention is related to the subject matter of the following commonly assigned, copending U.S. patent applications: Ser. No. 10/210,358, entitled "METHOD AND SYSTEM FOR IDENTIFYING INSTRUCTION COMPLETION DELAYS IN A PROCESSOR" and filed Jul. 31, 2002; and Ser. No. 10/210,357, entitled "SPECULATIVE COUNTING OF PERFORMANCE EVENTS WITH REWIND COUNTER" and filed Jul. 31, 2002. The content of the above-referenced applications is incorporated herein by reference.

BACKGROUND OF THE INVENTION

1. Technical Field

The present invention relates in general to the field of computers, and, in particular, to computer processors. Still more particularly, the present invention relates to an improved method and system for evaluating processing steps that affect an average cycles per instructions (CPI) time for the computer processor.

2. Description of the Related Art

A computer processor is capable of completing one or more instructions every clock cycle. Typically, instructions are completed in groups, which can be processed simultaneously through the use of multiple processing units operating simultaneously in the processor. The processing units are typically dedicated to a specific type of operation, such as performing an arithmetic function on a floating point number, performing an arithmetic function on a fixed point number, loading and storing data, setting processor condition registers, and calculating branching addresses. These multiple processing units typically permit pipelining of instructions, allowing a very high throughput of instructions.

Performance analysis of processors includes the calculation of the average cycles per instruction (CPI) required to complete an instruction. Although each instruction requires multiple steps and thus multiple clock cycles to complete, modem processors are able to process multiple instructions concurrently using multiple processing units as described above, thus reducing the average CPI time.

As the term implies, CPI describes the average number of clock cycles required to complete instructions. For example, if a processor takes an average of one clock cycle to complete each instruction, then the CPI is 1. If an average two clock cycles are required to complete each instruction, then the CPI is 2. Conversely, if an average of only one clock cycle is required to complete two instructions, then the CPI is 0.5 (½).

The processor's CPI performance is dependent on multiple factors, including the number of cycles to actually process the group of instructions in the processing units located in the processor, including delays caused by data cache misses, data dependency and execution time within a processing unit. In addition, CPI performance is affected by flushes to a completion table corresponding to a group of instructions to be or being processed. A completion table flush may be caused by any of several reasons, including a global flush of all completion tables and pipeline stacks in the processor, an instruction branch misprediction or an instruction cache miss. CPI performance is affected not only by the time required to re-fill the completion table, but by the time during which the table is empty as well.

In order to provide a way to evaluate the reasons for CPI delay, there is a need for a method and system to monitor the average time wasted for while a completion table is empty and then re-filled. Preferably, the method and system monitors and quantifies reasons for a completion table flush.

SUMMARY OF THE INVENTION

The present invention provides a method and system for analyzing cycles per instruction (CPI) performance in a processor. A completion table corresponds to the instructions in a group to be processed by the processor. An empty completion table indicates that there has been some type of catastrophe that caused a table flush. While the table is empty, a performance monitoring counter (PMC), located in a performance monitoring unit (PMU) in the processor, counts the number of clock cycles that the table is empty. Preferably, a separate PMC is utilized depending on the reason that the completion table is empty. A second PMC likewise counts the number of clock cycles spent re-filling the empty completion table. A third PMC counts the number of clock cycles spent actually executing the instructions in the completion table. The information in the PMC's can be used to evaluate the true cause for degradation of CPI performance.

The above, as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
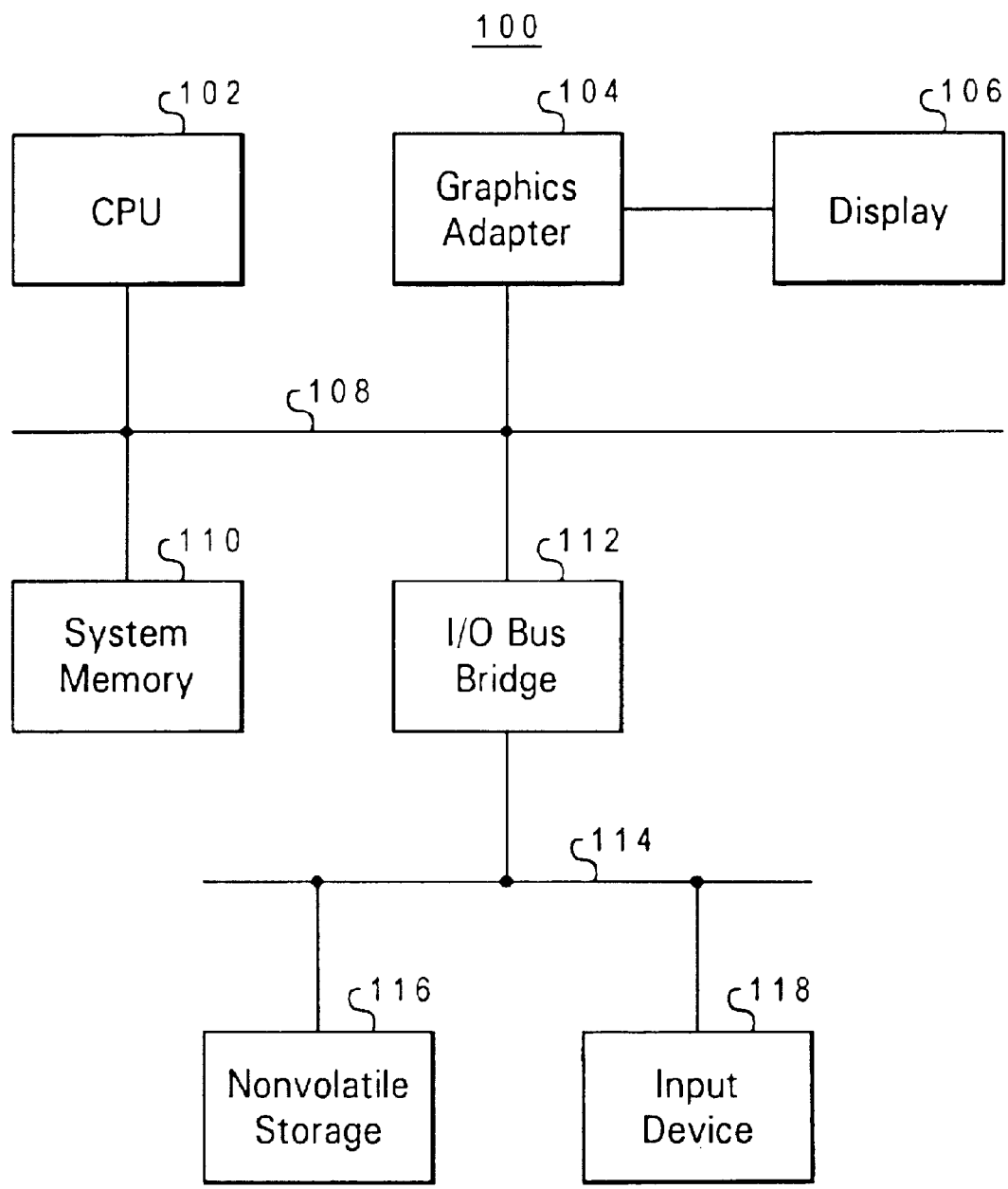
FIG. 1 is a block diagram of an exemplary computer system used in the present invention.

With reference now to the figures and, in particular to FIG. 1, there is depicted a block diagram of a data processing system in which a preferred embodiment of the present invention may be implemented. Data processing system 100 may be, for example, one of the models of personal computers available from International Business Machines Corporation of Armonk, N.Y. Data processing system 100 includes a central processing unit (CPU) 102, which is connected to a system bus 108. In the exemplary embodiment, data processing system 100 includes a graphics adapter 104 also connected to system bus 108, for providing user interface information to a display 106.

Also connected to system bus 108 are a system memory 110 and an input/output (I/O) bus bridge 112. I/O bus bridge 112 couples an I/O bus 114 to system bus 108, relaying and/or transforming data transactions from one bus to the other. Peripheral devices such as nonvolatile storage 116, which may be a hard disk drive, and input device 118, which may include a conventional mouse, a trackball, or the like, is connected to I/O bus 114.

The exemplary embodiment shown in FIG. 1 is provided solely for the purposes of explaining the invention and those skilled in the art will recognize that numerous variations are possible, both in form and function. For instance, data processing system 100 might also include a compact disk read-only memory (CD-ROM) or digital video disk (DVD) drive, a sound card and audio speakers, and numerous other optional components. All such variations are believed to be within the spirit and scope of the present invention.

Figure 2:
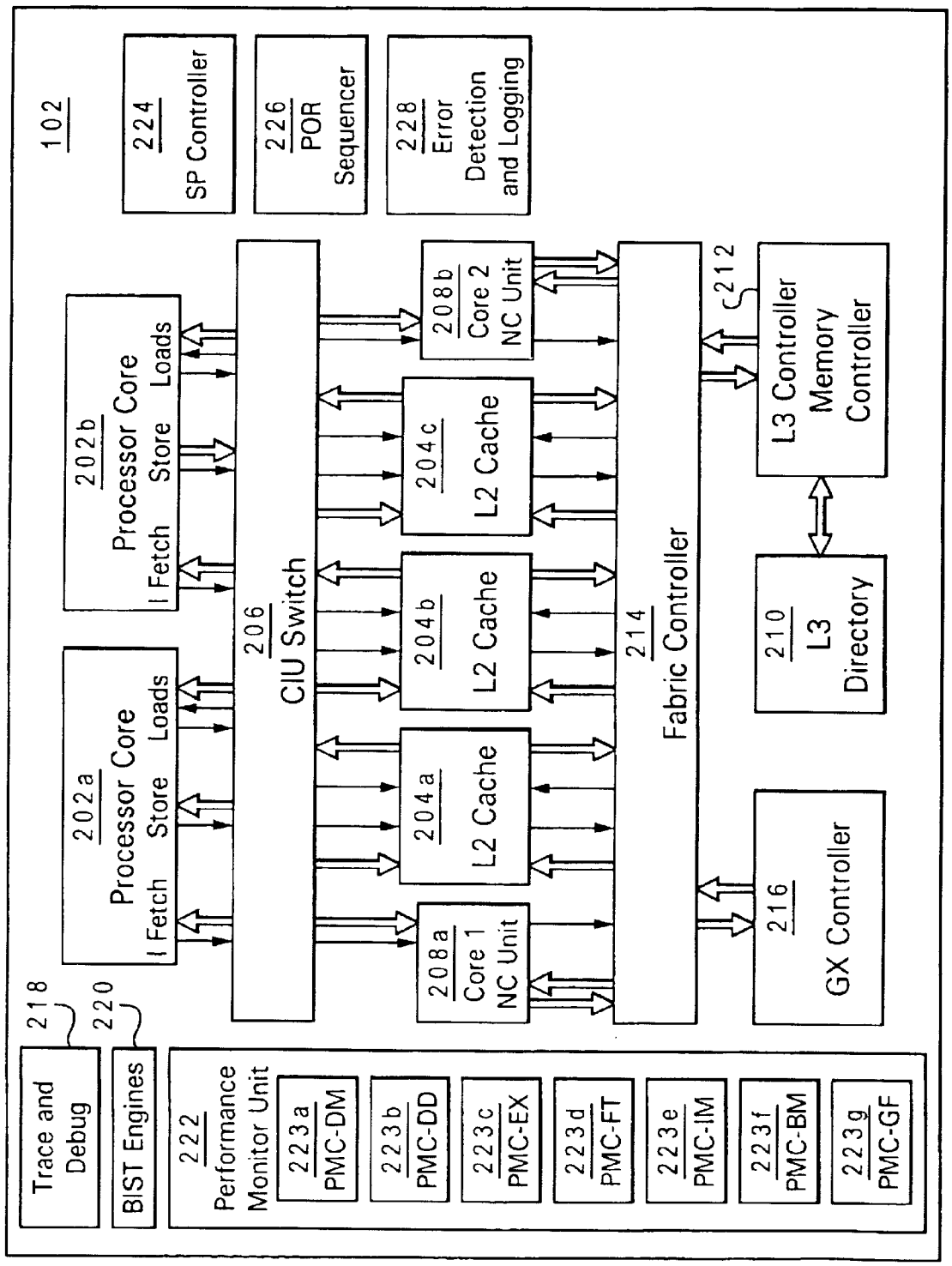
FIG. 2 depicts an exemplary processor used with the present invention.

The CPU 102 described in FIG. 1 is preferably a microprocessor such as the POWER4™ chip manufactured by International Business Machines, Inc. of Armonk, N.Y. With reference now to FIG. 2, such an exemplary microprocessor is depicted as CPU 102. In the preferred embodiment, at least two processor cores 202a and 202b are included in CPU 102. Processor cores 202 share a unified second-level cache system depicted as L2 caches 204a–204c, through a core interface unit (CIU) 206. CIU 206 is a crossbar switch between the L2 caches 204a–204c, each implemented as a separate, autonomous cache controller, and the two CPU's 202. Each L2 cache 204 can operate concurrently and feed multiple bytes of data per cycle. CIU 206 connects each of the three L2 caches 204 to either an L1 data cache (shown as D-cache 311 in FIG. 3) or an L1 instruction cache (shown as I-cache 320 in FIG. 3) in either of the two CPU's 102. Additionally, CIU 206 accepts stores from CPU 102 across multiple-byte-wide buses and sequences them to the L2 caches 204. Each CPU 102 has associated with it a non-cacheable (NC) unit 208, responsible for handling instruction-serializing functions and performing any non-cacheable operations in the storage hierarchy. Logically, NC unit 208 is part of L2 cache 204. As depicted, NC unit 208a is associated with processor core 202a, and NC unit 208b is associated with processor core 202b.

An L3 directory 210 for a third-level cache, L3 (not shown), and an associated L3 controller 212 are also part of CPU 102. The actual L3 may be onboard CPU 102 or on a separate chip. A separate functional unit, referred to as a fabric controller 214, is responsible for controlling dataflow between the L2 cache, including L2 cache 204 and NC unit 208, and L3 controller 212. Fabric controller 214 also controls input/output (I/O) dataflow to other CPUs 102 and other I/O devices (not shown). For example, a GX controller 216 can control a flow of information into and out of CPU 102, either through a connection to another CPU 102 or to an I/O device.

Also included within CPU 102 are functions logically called pervasive functions. These include a trace and debug facility 218 used for first-failure data capture, a built-in self-test (BIST) engine 220, a performance-monitoring unit (PMU) 222, a service processor (SP) controller 224 used to interface with a service processor (not shown) to control the overall data processing system 100 shown in FIG. 1, a power-on reset (POR) sequencer 226 for sequencing logic, and an error detection and logging circuitry 228.

As depicted, PMU 222 includes performance monitor counters (PMC) 223a–g. PMC's 223a–g may be allocated to count various events related to CPU 102. For example, PMC's 223a–c may be utilized to count clock cycles during which completion of instructions identified in a group completion table (GCT) is delayed due to Data Cache Misses (PMC-DM), data dependencies (PMC-DD) or execution delays (PMC-BX) of the instructions. Details of performance monitoring dining execution of a group of instructions are provided in co-pending U.S. patent application Ser. No. 10/210,358, entitled "METHOD AND SYSTEM FOR IDENTIFYING INSTRUCTION COMPLETION DELAYS IN A PROCESSOR", which is incorporated by reference in its entirety.

Further, PMC 223d (PMC-FT) may be used to count clock cycles spent waiting for instructions to Fill the global completion Table (GCT). Still further, PMC's 223e–g may be used to count clock cycles during which the GCT is empty (flushed) after an Instruction Miss (PMC-IM), an instruction Branch Misprediction (PMC-BM) or a Global Flush (PMC-GF). Details of the use of PMC's 223e–g are provided below.

Figure 3:
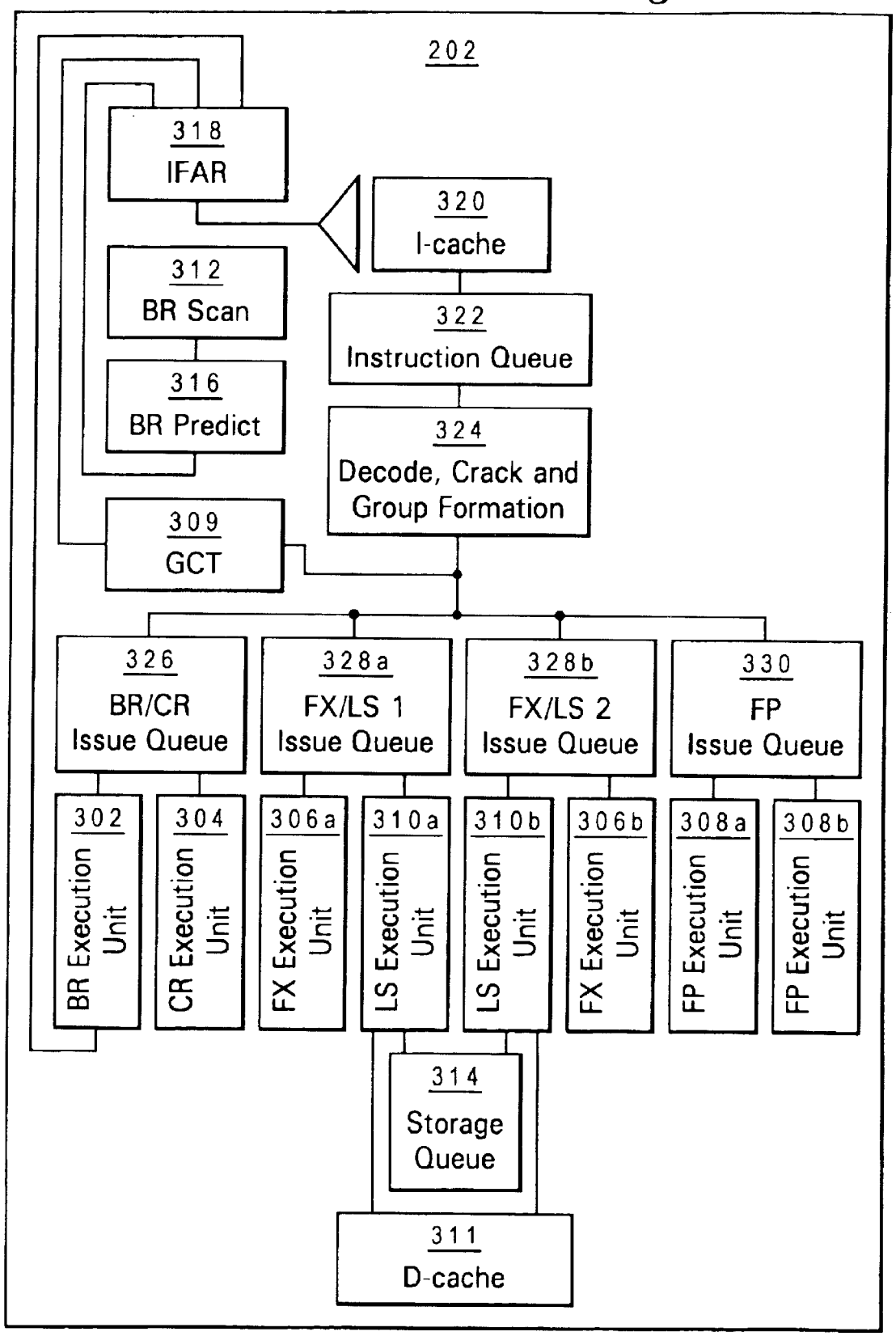
FIG. 3 illustrates an exemplary processor core used with the present invention.

With reference now to FIG. 3, there is depicted a high-level block diagram of processor core 202 depicted in FIG. 2. The two processor cores 202 shown in FIG. 2 are on a single chip and are identical, providing a two-way Symmetric Multiprocessing (SMP) model to software. Under the SMP model, either idle processor core 202 can be assigned any task, and additional CPUs 102 can be added to improve performance and handle increased loads.

The internal microarchitecture of processor core 202 is preferably a speculative superscalar out-of-order execution design. In the exemplary configuration depicted in FIG. 3, multiple instructions can be issued each cycle, with one instruction being executed each cycle in each of a branch (BR) execution unit 302, a condition register (CR) execution unit 304 for executing CR modifying instructions, fixed point (FX) execution units 306a and 306b for executing fixed-point instructions, load-store execution units (LSU) 310a and 310b for executing load and store instructions, and floating-point (FP) execution units 308a and 308b for executing floating-point instructions. LSU's 310, each capable of performing address-generation arithmetic, work with data cache (D-cache) 311 and storage queue 314 to provide data to FP execution units 308.

Global completion table (GCT) 309 is a table representing a group of instructions currently being processed by processor core 202. GCT 309 preferably stores the instruction, the logical program order of each instruction, and the completion order of each instruction in the group. For example, a group of three instructions stored in GCT 309 may contain data shown below in Table I.

TABLE I

| Program order | Instruction | Completion order |
|---|---|---|
| 1 | ADD R1, mem | 2 |
| 2 | ADD R2, R1 | 3 |
| 3 | LOAD R3, A | 1 |

Thus, the third program instruction (LOAD the contents of "A" into register R3) was the first to complete. The first program instruction (ADD the contents of memory location "mem" into register R1) was the second to complete, and the second program instruction (ADD the contents of register R1 into register R2 after the contents of R1 have been updated by the first program instruction) was the last to complete.

Upon certain catastrophic events, such as an instruction cache miss, an instruction branch misprediction, or a global flush of all queues and registers, including queues 326, 328 and 330, GCT 309 is emptied (flushed). Such a GCT 309 flush reflects a state of processor 202 in which execution processing must be restarted by reloading the appropriate queues to feed the execution units.

A branch-prediction scan logic (BR scan) 312 scans fetched instructions located in Instruction-cache (I-cache) 320, looking for multiple branches each cycle. Depending upon the branch type found, a branch-prediction mechanism denoted as BR predict 316 is engaged to help predict the branch direction or the target address of the branch or both. That is, for conditional branches, the branch direction is predicted, and for unconditional branches, the target address is predicted. Branch instructions flow through an Instruction-fetch address register (IFAR) 318, and I-cache 320, an instruction queue 322, a decode, crack and group (DCG) unit 324 and a branch/condition register (BR/CR) issue queue 326 until the branch instruction ultimately reaches and is executed in BR execution unit 302, where actual outcomes of the branches are determined. At that point, if the predictions were found to be correct, the branch instructions are simply completed like all other instructions.

If a prediction is found to be incorrect, the instruction-fetch logic, including BR scan 312 and BR predict 316, causes the mispredicted instructions to be discarded and begins refetching instructions along the corrected path. Such an instruction branch misprediction also causes instructions shown in GCT 309 to be flushed out.

Instructions are fetched from I-cache 320 on the basis of the contents of IFAR 318. IFAR 318 is normally loaded with an address determined by the branch-prediction logic described above. For cases in which the branch-prediction logic is in error, the branch-execution unit will cause IFAR 318 to be loaded with the corrected address of the instruction stream to be fetched. Additionally, there are other factors that can cause a redirection of the instruction stream, some based on internal events, others on interrupts from external events. In any case, once IFAR 318 is loaded, then I-cache 320 is accessed and retrieves multiple instructions per cycle. The I-cache 320 is accessed using an I-cache directory (IDIR) (not shown), which is indexed by the effective address of the instruction to provide required real addresses. On an I-cache 320 cache miss, instructions are returned from the L2 cache 204 illustrated in FIG. 2. In addition, an I-cache 320 cache miss will result in the flushing of GCT 309, in order to allow another group of instructions to load into the GCT 309 and the appropriate instruction queues.

When the instruction pipeline is ready to accept instructions, the IFAR 318 content is sent to I-cache 320, IDIR, IERAT, and branch-prediction logic. IFAR 318 is updated with the address of the first instruction in the next sequential sector. In the next cycle, instructions are received from I-cache 320 and forwarded to instruction queue 322 from which DCG unit 324 pulls instructions and sends them to the appropriate instruction issue queue, either BR/CR issue queue 326, fixed-point/load-store (FX/LD) issue queues 328a–328b, or floating-point (FP) issue queue 330.

As instructions are executed out of order, it is necessary to remember the program order of all instructions in flight. To minimize the logic necessary to track a large number of in-flight instructions, groups of instructions are formed. The individual groups are tracked through the system. That is, the state of the machine is preserved at group boundaries, not at an instruction boundary within a group. Any exception causes the machine to be restored to the state of the oldest group prior to the exception.

A group contains multiple internal instructions referred to as IOPs. In a preferred embodiment, in the decode stages, the instructions are placed sequentially in a group—the oldest instruction is placed in slot 0, the next oldest one in slot 1, and so on. Slot 4 is reserved solely for branch instructions. If required, no-ops are inserted to force the branch instruction to be in the fourth slot. If there is no branch instruction, slot 4 contains a no-op. Only one group of instructions is dispatched, i.e., moved into an issue queue, in a cycle, and all instructions in a group are dispatched together. Groups are dispatched in program order. Individual IOPs are issued from the issue queues to the execution units out of program order.

Results are committed, i.e., released to downstream logic, when the group completes. A group can complete when all older groups have completed and when all instructions in the group have finished execution. Only one group can complete in a cycle.

Figure 4:
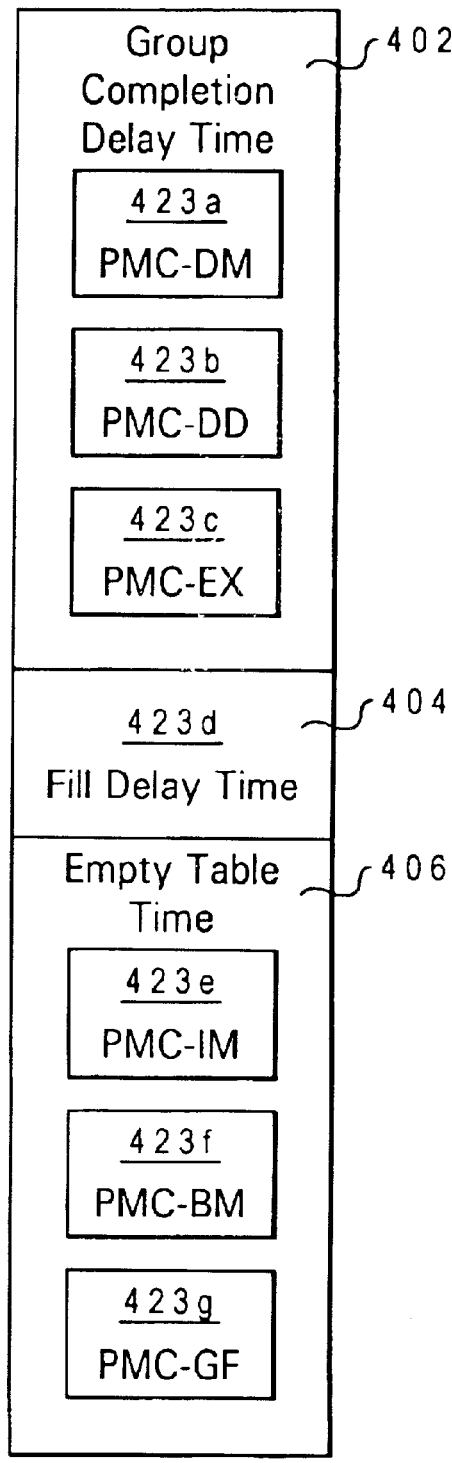
FIG. 4 depicts a cycles per instruction (CPI) stack showing the number of clock cycles spent for various instruction delays.

With reference now to FIG. 4, there is depicted a Cycles per Instruction (CPI) stack 400. CPI stack 400 represents values stored in PMC's 223 located in PMU 222, described above in FIG. 2.

Within CPI stack register 402 are stored the number of cycles expended to complete a group of instructions, as described in a preferred embodiment in co-pending U.S. patent application Ser. No. 10/210,358, entitled "METHOD AND SYSTEM FOR IDENTIFYING INSTRUCTION COMPLETION DELAYS IN A PROCESSOR" and filed Jul. 31, 2002, herein incorporated by reference in its entirety. CPI stack register 402 contains the total count of group completion delay times (in processor clock cycles), and may either be a single value, or may be broken out into clock cycles expended for specific group completion delay reasons. Far example, upon number of clock cycles spent waiting for a data miss are stored in both PCM 223a and CPI register 423a, data dependency clock cycles are stored in PCM 223b and CPX register 423b, and execution delays are stored in PCM 223c and CPI register 423c. Alternatively, the group completion delay time may be stored in CPI stack register 402 as a single entry that disregards the specific cause of the group completion delay. That is, alternatively CFI stack register 402 simply adds to the content stored in CPI stack register 402 the number of clock cycles recorded in either PMC 223a, 223b or 223c.

CPI stack register 404 contains the number of cycles required to refill GCT 309 table after GCT 309 is flushed. Exemplary reasons why GCT 309 would be flushed (emptied) are described above as instruction cache misses, instruction branch mispredictions and global flushes. The number of clock cycles spent refilling GCT 309 are cumulatively counted (added to the number of clock cycles spent refilling GCT 309 after previous GCT 309 flushes) by PMC 223d, and then stored in CPI stack register 423d.

When a GCT 309 is flushed, there is a length of time (in processor clock cycles) during which GCT 309 is empty before refilling begins. In a preferred embodiment, the reason why GCT 309 is flushed is determined by examining logic within processor 202 which may be implemented by a variety of methods well known to those skilled in the art of computer architecture. For example, an instruction cache miss may result in a flag being raised in any chosen register or group of registers, except of course GCT 309, indicating the cause for flushing GCT 309.

Hardware logic or software can read a flag indicating the cause for flushing GCT 309. This cause determination likely requires multiple clock cycles, however. Therefore, PMC counters 223e–g all count clock cycles from the time GCT 309 is flushed until GCT 309 begins to refill. By the time GCT 309 begins to refill, a determination has been made as to the cause of the flushing of GCT 309. If the cause for flushing GCT 309 is an instruction miss, then the contents of PMC 223e are retained (which include the number of clock cycles GCT 309 was empty due to the most recent flush as well as any prior flushes), and the contents of PMC's 223f and 223g are "rewound" to their content held prior to the most recent GCT 309 flush. The preferred method and system for rewinding PMC's 223 are described in U.S. patent application Ser. No. 10/210,357, entitled "SPECULATIVE COUNTING OF PERFORMANCE EVENTS WITH REWIND COUNTER," herein incorporated by reference in its entirety. The content of PMC 223e replaces the content previously stored in CPI stack register 423e, reflecting the total number of clock cycles spent with GCT 309 being empty due to instruction cache misses.

Likewise, clock cycles for instruction branch mispredictions are stored in PCM 223f and CPI stack register 423f, and clock cycles spent on global flushes are stored in PCM 223g and CPI stack register 423g.

Alternatively, the number of clock cycles spent while GCT 309 is empty after a flush may be stored in a single register, whose content does not reflect the reason why the GCT 309 is empty. Such an embodiment requires only counting the number of clock cycles after a GCT 309 flush when GCT 309 is still empty, and does not require separate cause PMC's 223 for each flush causation.

Figure 5:
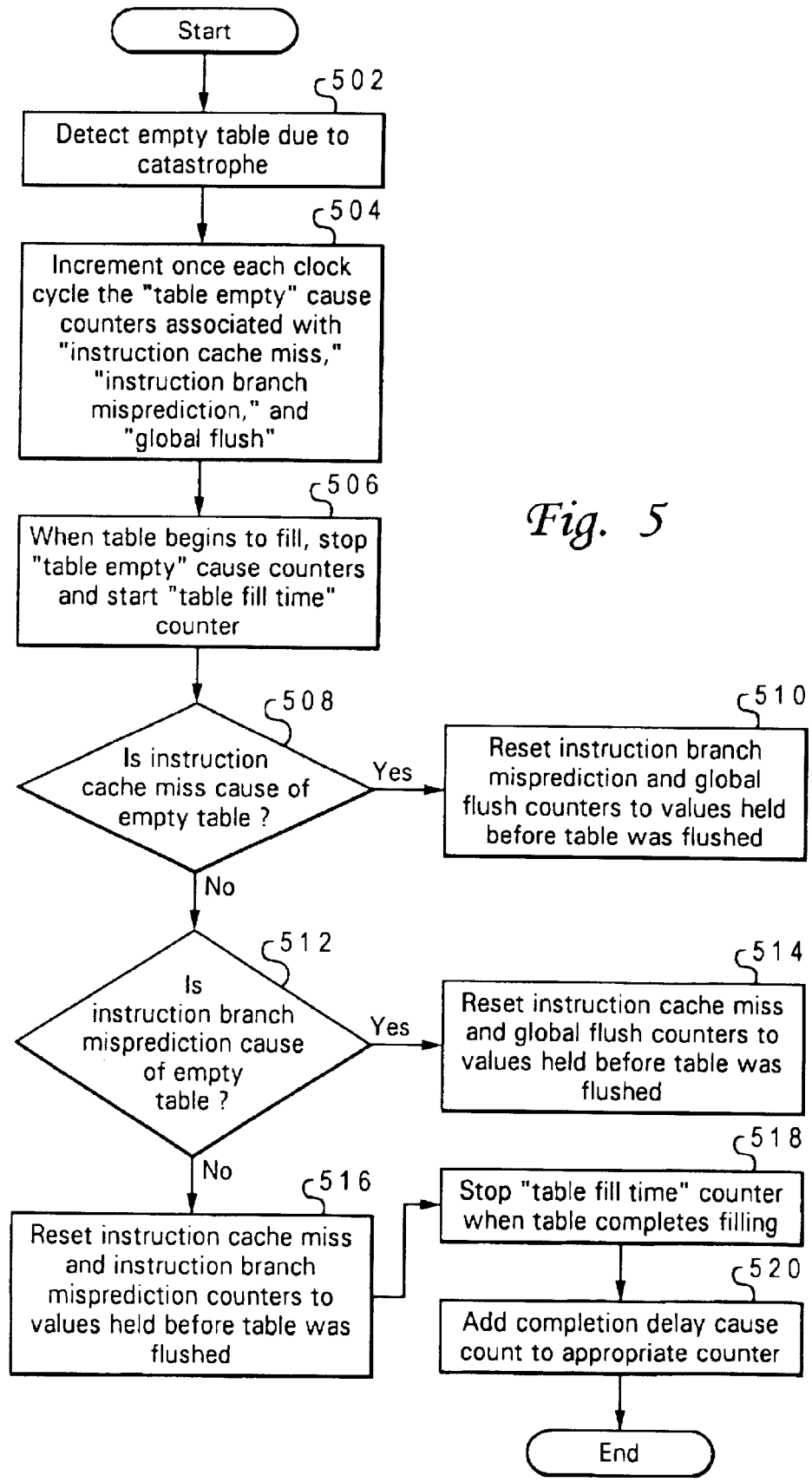
FIG. 5 is a flowchart of logic used in the present invention for determining group completion delay times, measured in processor clock cycles, including the delay attributed to a completion table flush.

With reference now to FIG. 5, there is depicted a flow chart of a process for determining the reason that a GCT is flushed. As shown in block 502, the GCT is detected as being empty due to a catastrophe such as an instruction cache miss, an instruction branch misprediction or a global flush, as described above. As depicted in block 504, upon that initial detection, counters, such as PMC's 223 shown in FIG. 2, begin counting clock cycles. For purposes of illustration, it is assumed that only three such counters are in use. Each of the three counters respectively count the number of clock cycles that pass while the GCT table is empty, with one of the counters being associated with an instruction cache miss, one with an instruction branch misprediction and one with a global flush cause.

When the table begins to fill, "table empty" cause counters (such as PMC's 223e–g discussed above for counting clock cycles associated with instruction cache misses, instruction branch mispredictions and global flushes) stop counting clock cycles, and the "table fill time" counter (such as PMC 223d discussed above to count table filling cycles) immediately begins counting clock cycles.

As shown in query block 508, if the cause of the GCT being empty is an instruction cache miss, then as shown in block 510 the instruction branch misprediction and global flush counters are reset (rewound) to the values held before the table was flushed, leaving the instruction cache miss counter to retain the number of clock cycles attributed to the latest GCT flush. Similarly, as depicted in blocks 512 and 514, if the instruction branch misprediction is the cause of the GCT flush, then the counter associated with instruction branch mispredictions retains the count of the clock cycles during which the GCT remained empty after the latest GCT flush. Finally, if the cause of the GCT flush was a global flush, then counters other than the global flush counter are reset, as described in block 516, leaving the global flush counter intact with the number of clock cycles counted.

As an illustration of the events described in blocks 504–516, assume that there are three causes for a GCT flush (emptying). Initially, assume all PMC's (performance monitoring counters) are set at zero, as shown in Table I.

TABLE I

| Instruction cache miss Counter (clock cycles) | Branch misprediction Counter (clock cycles) | Global flush Counter (clock cycles) |
| --- | --- | --- |
| 0 | 0 | 0 |

Upon a GCT flush, each of the counters start counting clock cycles. Assume that the GCT begins filling up with instructions again after 12 clock cycles. The contents of the PCM's are then as shown in TABLE II.

TABLE II

| Instruction cache miss Counter (clock cycles) | Branch misprediction Counter (clock cycles) | Global flush Counter (clock cycles) |
| --- | --- | --- |
| 12 | 12 | 12 |

Assume that the reason the GCT was flushed was an instruction cache miss. Then the counters for instruction branch misprediction and global flush are reset (rewound) to the value they held before the latest GCT flush, as shown in Table III.

TABLE III

| Instruction cache miss Counter (clock cycles) | Branch misprediction Counter (clock cycles) | Global flush Counter (clock cycles) |
| --- | --- | --- |
| 12 | 0 | 0 |

Assume now that another GCT flush occurs at a later time, and the GCT is empty for 14 clock cycles. At the time the GCT begins to fill, the counters contain the values shown in Table IV.

TABLE IV

| Instruction cache miss Counter (clock cycles) | Branch misprediction Counter (clock cycles) | Global flush Counter (clock cycles) |
| --- | --- | --- |
| 26 | 14 | 14 |

Assume that this latest GCT flush was caused by an instruction branch misprediction. Then the counters associated with the instruction cache miss and global flush are rewound, and the contents are as shown in Table V.

TABLE V

| Instruction cache miss Counter (clock cycles) | Branch misprediction Counter (clock cycles) | Global flush Counter (clock cycles) |
| --- | --- | --- |
| 12 | 14 | 0 |

This process continues for each subsequent GCT flush, until all groups of instructions are completed, and the causes for the GCT flushes are to be evaluated.

Now discussing FIG. 5 further, when the GCT finishes filling with new instructions, the counter associated with the fill time stops, as shown in block 518. As there is only one counter for table fill time, no rewind operations are required.

Finally as shown in block 520, the cumulative clock cycles required to complete groups of instructions are stored in the appropriate PMC, as discussed more fully in co-pending U.S. patent application Ser. No. 10/210,358, entitled "METHOD AND SYSTEM FOR IDENTIFYING INSTRUCTION COMPLETION DELAYS IN A PROCESSOR" and filed Jul. 31, 2002, herein incorporated by reference in its entirety.

The present invention therefore provides a mechanism for evaluating a large number of groups of instructions to determine what caused an increase or reduction in CPI's. For example, a large number of cycles spent waiting for the GCT to begin to refill suggests to a computer of software engineer that there are too many instruction misses, instruction branch mispredictions, global flushes or other causes for GCT flushes. A large number of cycles spent refilling the GCT may indicate a problem with hardware logic that is slowing down the re-filling process. A large number of clock cycles spent waiting for instructions to complete execution may indicate a problem with software strategy or hardware design. By identifying the primary cause of delays, the programmer and/or computer architect can reduce the causes for execution bottlenecks.

It should be appreciated that the method described above can be embodied in a computer readable storage medium containing a computer program product in a variety of forms, and that the present invention applies equally regardless of the particular type of media utilized to actually carry out the method described in the invention. Examples of media include, without limitation, recordable type media such as floppy disks or compact disk read-only memories (CD ROMS).

While the invention has been particularly shown and described with reference to a preferred embodiment, it will be understood by those skilled in the art that various changes in form and detail may be made therein without departing from the spirit and scope of the invention.

What is claimed is:

1. A method for analyzing causes for an instruction table flush in a processor, said method comprising:

counting a number of clock cycles to transpire while an instruction table is empty after a latest instruction table flush;

counting a number of clock cycles to transpire while said instruction table is refilling with instructions;

counting a number of clock cycles to transpire while said refilled instructions execute;

assigning a different counter, selected from a plurality of counters, to each of a plurality of possible causes for said latest instruction table flush;

counting in all of said plurality of counters said number of clock cycles to transpire while said instruction table is empty;

determining a cause for said latest instruction table flush;

retaining a value representing a number of clock cycles to transpire while said instruction table is empty in a counter associated with said cause for said latest instruction table flush; and resetting said plurality of counters, other than said counter associated with said cause for said latest instruction table flush, to a value stored in said plurality of counters before said latest instruction flush.

2. The method of claim 1, said step for counting said number of clock cycles to transpire while said instruction table is empty further comprises:

assigning a dedicated counter for a specific cause of said latest instruction table flush; said dedicated counter counting said number of clock cycles to transpire while said instruction table is empty after said latest instruction table flush due to said specific cause.

3. A system for analyzing causes for an instruction table flush in a processor, said system comprising:

means for counting a number of clock cycles to transpire while an instruction table is empty after a West instruction table flush;

means for counting a number of clock cycles to transpire while said instruction table is refilling with instructions; and means for counting a number of clock cycles to transpire while said refilled instructions execute;

means for assigning a different counter, selected from a plurality of counters, to each of a plurality of possible causes for said latest instruction table flush;

means for counting in all of said plurality of counters said number of clock cycles to transpire while said instruction table is empty;

means for determining a cause for said latest instruction table flush;

means for retaining a value representing a number of clock cycles to transpire while said instruction table is empty in a counter associated with said cause for said latest instruction table flush; and means for resetting said plurality of counters, other than said counter associated with said cause for said latest instruction table flush, to a value stored in said plurality of counters before said latest instruction flush.

4. The system of claim 3, means for counting said number of clock cycles to transpire while said instruction table is empty further comprising:

means for assigning a dedicated counter for a specific cause of said latest instruction table flush; said dedicated counter counting said number of clock cycles to transpire while said instruction table is empty after said latest instruction table flush due to said specific cause.

5. A computer readable storage medium for analyzing causes for an instruction table flush in a processor, said computer readable storage medium comprising:

computer program code for counting a number of clock cycles to transpire while an instruction table is empty after a latest instruction table flush;

computer program code for counting a number of clock cycles to transpire while said instruction table is refilling with instructions; and computer program code for counting a number of clock cycles to transpire while said refilled instructions execute;

computer program code for assigning a different counter, selected from a plurality of counters, to each of a plurality of possible causes for said latest instruction table flush;

computer program code for counting in all of said plurality of counters said number of clock cycles to transpire while said instruction table is empty;

computer program code for determining a cause for said latest instruction table flush;

computer program code for retaining a value representing a number of clock cycles to transpire while said instruction table is empty in a counter associated with said cause for said latest instruction table flush; and computer program code for resetting said plurality of counters, other than said counter associated with said cause for said latest instruction table flush, to a value stored in said plurality of counters before said latest instruction flush.

6. The computer readable storage medium of claim 5, said computer program code for counting said number of clock cycles to transpire while said instruction table is empty further comprising:
 computer program code for assigning a dedicated counter for a specific cause of said latest instruction table flush; said dedicated counter counting said number of clock cycles to transpire while said instruction table is empty after said latest instruction table flush due to said specific cause.

7. A computer system for analyzing causes for an instruction table flush in a processor, said computer system comprising:
 at least one counter for counting a number of clock cycles to transpire while an instruction table is empty after a latest instruction table flush;
 at least one counter for counting a number of clock cycles to transpire while said instruction table is refilling with instructions; and
 at least one counter for counting a number of clock cycles to transpire while said refilled instructions execute;
 a plurality of counters each assigned to a different possible cause for said latest instruction table flush, each of said plurality of counters counting said number of clock cycles to transpire while said instruction table is empty;
 a status indicator that identifies a cause for said latest instruction table flush; and
 a reset mechanism, wherein upon a completion of said table refilling, said plurality of latest instruction table flush, are reset to a value stored in said counters before said latest instruction flush.

8. The computer system of claim 7, said at least one counter for counting said number of clock cycles to transpire while said instruction table is empty further comprising:
 a dedicated counter for a specific cause of said latest instruction table flush, said dedicated counter counting said number of clock cycles to transpire while said instruction table is empty after said latest instruction table flush due to said specific cause.

* * * * *